United States Patent
Isogai et al.

(10) Patent No.: US 8,358,041 B2
(45) Date of Patent: Jan. 22, 2013

(54) ELECTRIC MOTOR HAVING WIRE CONNECTION STRUCTURE AND WIRE CONNECTION METHOD FOR THE SAME

(75) Inventors: Shigetaka Isogai, Nishio (JP); Masafumi Sakuma, Chiryu (JP); Ryoji Mizutani, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 313 days.

(21) Appl. No.: 12/818,677

(22) Filed: Jun. 18, 2010

(65) Prior Publication Data

US 2010/0320852 A1    Dec. 23, 2010

(30) Foreign Application Priority Data

Jun. 18, 2009 (JP) .................... 2009-145715

(51) Int. Cl.
*H02K 11/00* (2006.01)
(52) U.S. Cl. .................... 310/71; 29/596
(58) Field of Classification Search .......... 310/71; 29/596–598; 439/364, 709, 801
See application file for complete search history.

(56) References Cited

U.S. PATENT DOCUMENTS

2002/0043883 A1* 4/2002 Shimizu .................. 310/71
2002/0050752 A1* 5/2002 Katsuzawa et al. ........ 310/71

FOREIGN PATENT DOCUMENTS

JP    2005-271909 A    10/2005
JP    2005271909 A  * 10/2005

* cited by examiner

*Primary Examiner* — Quyen Leung
*Assistant Examiner* — Leda Pham
(74) *Attorney, Agent, or Firm* — Buchanan Ingersoll & Ingersoll

(57) ABSTRACT

An electric motor having a wire connection structure includes a stator including a stator coil, a rotor, a motor housing accommodating the stator and the rotor and having a hole, a cable retaining portion formed on the motor housing for retaining end portions of feed cables, a fixing portion formed on the stator, first terminals connected to the stator coil and arranged on the fixing portion in an orientation different from an orientation of the end portions, second terminals each projecting from each of the end portions to face the corresponding first terminal after being inserted into the hole, at least one of the second terminals being bent, and screw members engaged with the fixing portion after being inserted into the corresponding first and second terminals, each of the screw members jointly fastening the first and second terminals to the fixing portion to electrically connect the first and second terminals.

7 Claims, 6 Drawing Sheets

ELECTRIC MOTOR HAVING WIRE CONNECTION STRUCTURE AND WIRE CONNECTION METHOD FOR THE SAME

CROSS REFERENCE TO RELATED APPLICATIONS

This application is based on and claims priority under 35 U.S.C. §119 to Japanese Patent Application 2009-145715, filed on Jun. 18, 2009, the entire content of which is incorporated herein by reference.

TECHNICAL FIELD

This disclosure relates to an electric motor having a wire connection structure for connecting plural feed cables which supply a polyphase alternating current from outside to the electric motor.

BACKGROUND DISCUSSION

JP2005-271909A discloses a known cable routing method for connecting plural feed cables to an electric motor mounted to a driving wheel of a vehicle. According to the known method disclosed in JP2005-271909A, the plural feed cables descending from an upper arm of the vehicle are retained to be stored in a wiring box (hereinafter referred to as a terminal block) formed at an outer periphery of a motor housing of the electric motor. Although details of an inside of the terminal block is not referred to in JP2005-271909A, a terminal formed at an end portion of the feed cable and a terminal of a stator coil of the electric motor are electrically connected each other by most likely jointly fastening the terminals to the terminal block by means of a bolt.

For the purpose of avoiding the cables from interfering with other parts of the vehicle, cable routings are restricted by various conditions. In case of arranging the cable for the electric motor, an approaching direction of the cable to the electric motor has been limited. Thus, arrangements of each of the feed cables when retaining end portions of the plural feed cables which approach the electric motor to the terminal block has also been limited to particular arrangements.

On the other hand, viewing from a standpoint of the electric motor, because the stator coils are arranged circumferentially, plural terminals of the stator coils connected to the cables are consequently arranged in different directions from the arrangement of the end portion of the feed cable retained at the terminal block. Differences of the arrangement direction (orientation) of the end portion of the feed cable and the terminal of the stator coil are compensated by using a bus bar on the terminal block.

According to the known device, in a case where the terminal of the retained feed cable and the coil terminal of the electric motor are electrically connected each other by jointly fastening the terminals by the bolt on the terminal block, a shear stress and a bending stress are applied to the terminal block, and the terminal block has to be increased in size in order to reduce damage or deformation of the terminal block by the stresses.

Further, in a case where the terminal of the feed cable and the terminal of the coil are connected via the bus bar, or the like, the size of the terminal block is further increased to accommodate a bolt, or the like, to connect the bus bar to the terminal of the feed cable and the terminal of the coil and a manufacturing cost is increased in response to an increase of the number of components.

Those drawbacks are assumed to be more critical in a case where electrically conductive dimensions of each member are increased in order to supply a large current to the electric motor.

A need thus exists for an electric motor having a wire connection structure and a wire connection method for the same which is not susceptible to the drawback mentioned above.

SUMMARY

In light of the foregoing, the disclosure provides an electric motor having a wire connection structure for connecting plural feed cables, which supply a polyphase alternating current from outside, to the electric motor, which includes a stator including a stator coil, a rotor arranged at an inner side relative to an inner circumferential surface of the stator to be rotatable relative to the stator. The electric motor having the wire connection structure further includes a motor housing accommodating therewithin the stator and the rotor, the motor housing formed with a through hole, a cable retaining portion formed on the motor housing for retaining each end portion of the feed cables in a predetermined arrangement, a fixing portion formed on the stator and extending towards the through hole from an inside of the motor housing, plural first terminals connected to the stator coil and arranged on the fixing portion in an orientation different from the predetermined arrangement of the end portions of the feed cables, plural second terminals, each of the second terminals projecting from the end portion of each of the feed cables and being superimposed on the corresponding first terminal after being inserted into the through hole from outside of the motor housing, at least one of the second terminals being bent for connecting the end portion of the feed cable and the first terminal, and plural screw bolts threadedly engaged with the fixing portion after being inserted into the corresponding first terminals and the second terminals, each of the screw bolts jointly fastening the corresponding first terminal and the second terminal to the fixing portion so that the first terminal and the second terminal are electrically connected.

Another aspect of the disclosure provides a method for connecting wire for an electric motor for connecting plural feed cables which supply a polyphase alternating current from outside to the electric motor including a stator having a stator coil, a rotor arranged at an inner side relative to an inner circumferential surface of the stator to be rotatable relative to the stator, and a motor housing accommodating therewithin the stator and the rotor and having a through hole, which includes steps of: providing a cable retaining portion retaining an end of each of feed cables in a predetermined direction on the motor housing, providing a fixing portion extending towards the through hole from an inside of the stator, arranging each of first terminals, which is connected to the stator coil, in a direction different from the predetermined direction of the end portion of the feed cable, superimposing each of second terminals projecting from the end portions of each of the feed cables on the corresponding first terminal after inserting the second terminal into the through hole from outside of the motor housing, connecting the end portion of the feed cable, which corresponds to the second terminal, and the first terminal by means of at least one bent second terminal among the second terminals, and jointly fastening the first terminal and the second terminal to the fixing portion by engaging each screw bolt with the fixing portion after inserting the screw bolt into the corresponding first terminal and the second terminal so that the first terminal and the second terminal are electrically connected.

Further aspect of the disclosure provides an electric motor having a wire connection structure for connecting plural feed cables, which supply a polyphase alternating current from outside, to the electric motor, which includes a stator including a stator coil, a rotor rotatably provided relative to the stator, a motor housing accommodating the stator and the rotor, the motor housing formed with a through hole, a cable retaining portion formed on the motor housing for retaining end portions of the plural feed cables, a fixing portion formed on the stator and extending towards the through hole, plural first terminals connected to the stator coil and arranged on the fixing portion in an orientation different from an orientation of the end portions of the feed cables, plural second terminals, each of the second terminals projecting from each of the end portions of the feed cables to face the corresponding first terminal after being inserted into the through hole from outside of the motor housing, at least one of the plural second terminals being bent, and plural screw members engaged with the fixing portion after being inserted into the corresponding first terminals and the second terminals, each of the screw members jointly fastening the corresponding first terminal and the second terminal to the fixing portion so that the first terminal and the second terminal are electrically connected.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
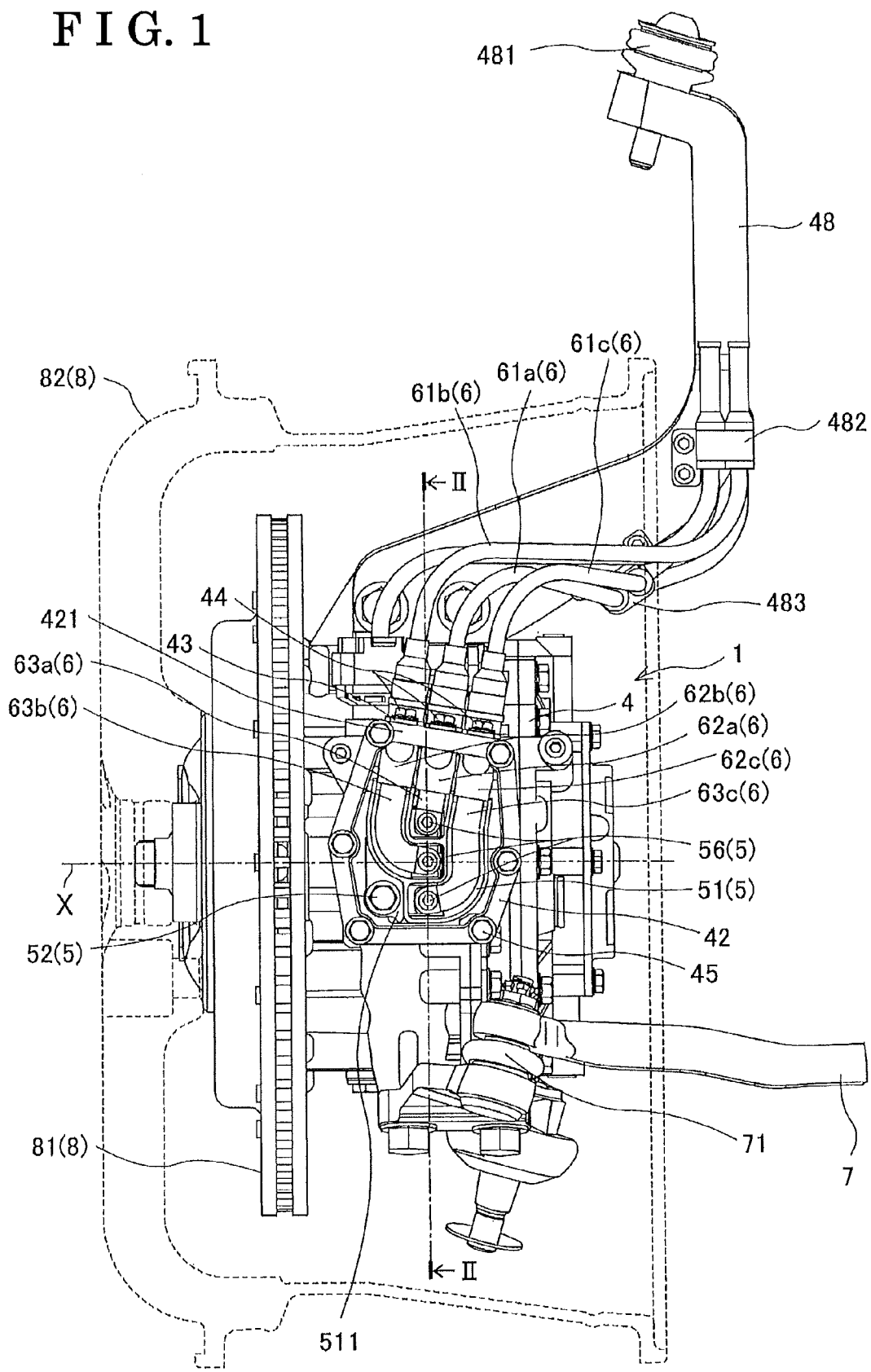
FIG. 1 is a view showing a front wheel portion of a vehicle to which an in-wheel motor is mounted according to a first embodiment disclosed here.

One embodiment of an electric motor having a wire connection structure and a wire connection method for the same will be explained with reference to illustrations of drawing figures as follows.

A wire connection structure between an in-wheel motor 1, which serves as an electric motor, and an electric power supply wiring member 6 (i.e., including feed cables 6, plugs 62, and second terminals 63) will be described below with reference to FIGS. 1 to 8. In this embodiment, a near side to a reader in FIG. 1 and a left side in FIG. 2 correspond to a forward direction of a vehicle. However, directions are not limited to this disclosure. Furthermore, in this embodiment, an up-and-down direction in FIGS. 1 and 2 substantially correspond to an up-and-down direction of the vehicle. Additionally, a tire, which is to be attached on a front wheel 8, is not illustrated in FIG. 1.

As illustrated in FIG. 1, the in-wheel motor 1 is arranged at an inner portion of the front wheel 8 (which serves as a driving wheel) of the vehicle. The in-wheel motor 1 is connected to a steering knuckle arm 48, to which a steering force of the vehicle is inputted, at an upper portion of the in-wheel motor 1. The steering knuckle arm 48 supports the front wheel 8 together with the in-wheel motor 1. Furthermore, the in-wheel motor 1 is connected to a lower arm 7, which configures a portion of a front suspension, at a lower portion of the in-wheel motor 1.

A disk rotor 81, which configures a portion of the front wheel 8 and which is connected to a speed reduction mechanism of the in-wheel motor 1, is provided at the left of the in-wheel motor 1 in FIG. 1. A disk wheel 82 is attached at a left portion of the disk rotor 81 in FIG. 1, so that the disk wheel 82 covers the disk rotor 81 and the in-wheel motor 1. A tire is attached at the disk wheel 82 to configure the front wheel 8 of the vehicle.

An upper ball joint 481 is formed at an upper end portion of the steering knuckle arm 48, so that the steering knuckle arm 48 is connected to an upper arm of the front suspension via the upper ball joint 481. A lower ball joint 71 is formed at an end portion of the lower arm 7. The in-wheel motor 1 is pivoted about the upper ball joint 481 and the lower ball joint 71 in a substantially horizontal direction together with the steering knuckle arm 48, the disk rotor 81 and the disk wheel 82 in response to an operation of a steering wheel of the vehicle.

Figure 2:
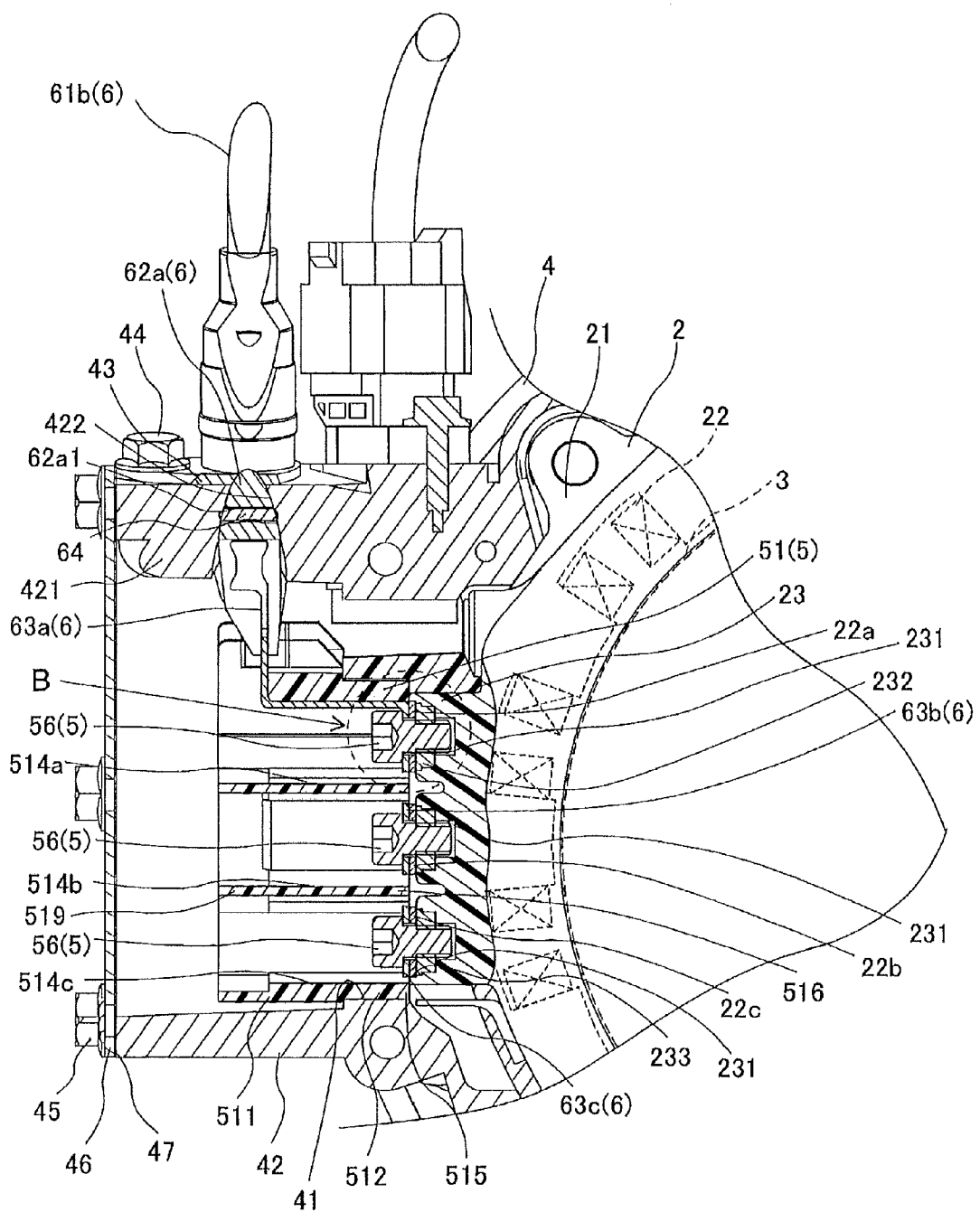
FIG. 2 is a cross-sectional view of a partial front wheel portion of the vehicle taken on line II-II in FIG. 1.
Figure 3:
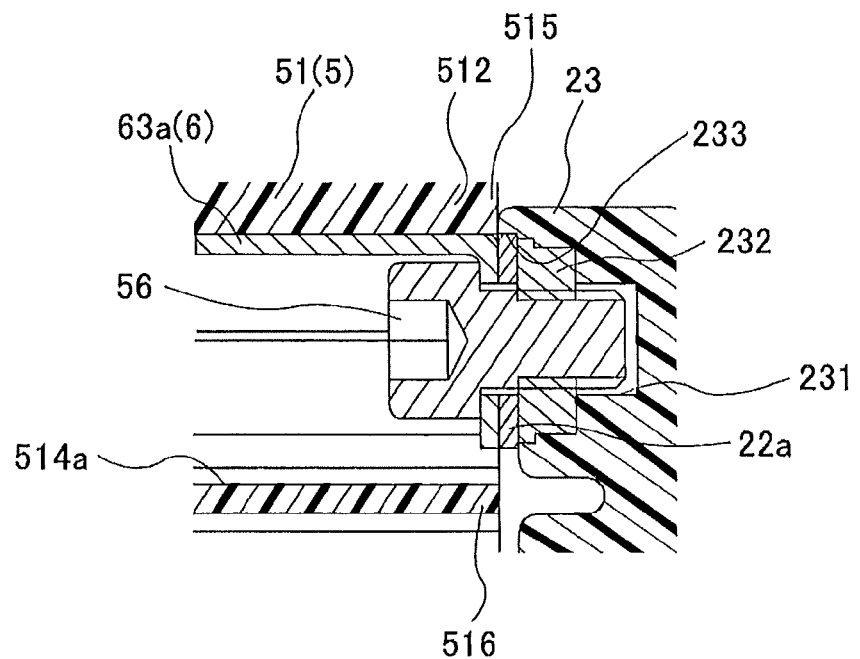
FIG. 3 is an enlarged view of portion B shown in FIG. 2.
Figure 4:
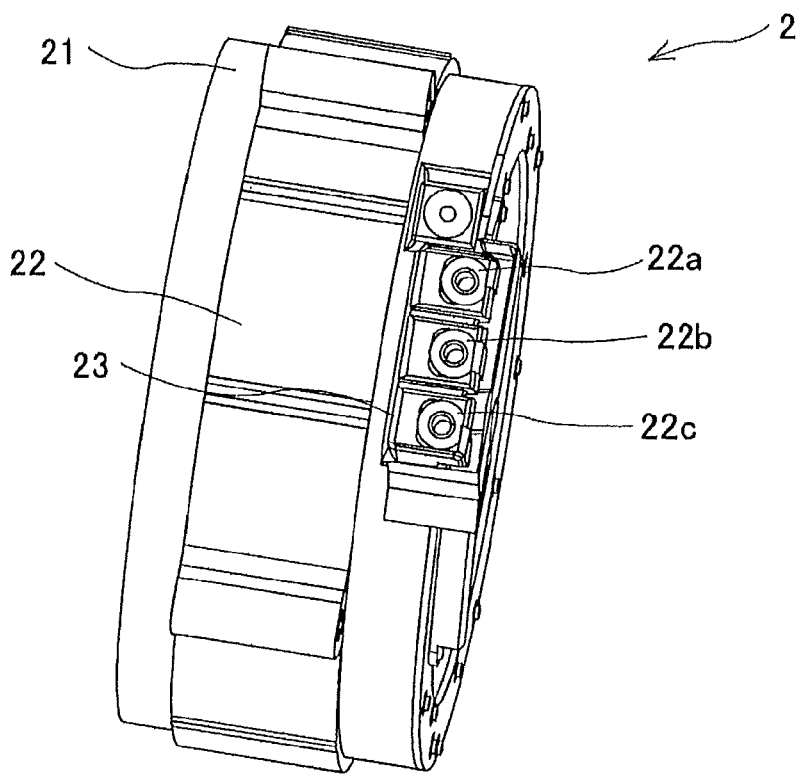
FIG. 4 is a perspective view of a stator before terminals are connected thereto.

A known three-phase synchronous motor is adapted to the in-wheel motor 1. More specifically, as illustrated in FIG. 2, the in-wheel motor 1 includes a stator 2, a rotor 3 and a motor housing 4. The rotor 3 is arranged at a position keeping a slight clearance between an inner circumferential portion of the stator 2 and the rotor 3, while allowing the rotor 3 to be rotatable relative to the stator 2. The rotor 3 is arranged so that a rotational axis of the rotor 3 is coaxial to a rotational axis of the front wheel 8. The motor housing 4 is formed in a substantially cylindrical shape, so that the motor housing 4 accommodates therewithin the stator 2 and the rotor 3. Furthermore, the motor housing 4 is connected to the steering knuckle arm 48.

The stator 2 includes plural stator coils 22, which are retained at an inner side relative to an inner circumferential portion of a stator housing 21 in circular manner, in order to generate a rotating magnetic field. The stator coils 22 are connected to an inverter by means of the electric power supply wiring member 6. The inverter is connected to a high-voltage battery of the vehicle. Accordingly, the electric power is supplied to the stator coils 22 from the high-voltage battery, thereby rotating the rotor 3 of the in-wheel motor 1. After a speed of a rotation of the rotor 3 is reduced by means of the speed reduction mechanism, the decelerated rotation of the rotor 3 is transmitted to the disk wheel 82 via the disk rotor 81, thereby driving the front wheel 8 about a rotational axis X shown in FIG. 1.

The connecting structure between the in-wheel motor 1 and the electric power supply wiring member 6 will be described below in more detail. Each of the stator coils 22 of the stator 2 is covered with an insulating resin member. The insulating resin member is formed so as to outwardly protrude from one portion of an outer peripheral portion of the stator 2 in a radial direction of the stator 2, thereby forming a terminal attaching portion 23, which serves as a fixing portion (see FIG. 2). The terminal attaching portion 23 is formed in a substantially rectangular cuboidal shape, so that the terminal attaching portion 23 faces a terminal insertion portion 512, which is formed at a bottom surface of a terminal block 51 (i.e., lateral side in a state where the terminal block 51 is mounted to the vehicle), which serves as a base block.

A terminal block insertion hole 41, which serves as a through hole, is formed at the motor housing 4 so as to penetrate therethrough so that an outer side thereof communicates with an inner side thereof. The terminal attaching portion 23 is arranged within the motor housing 4 so as to face the terminal block insertion hole 41 from the inside of the motor housing 4. The terminal block insertion hole 41 is formed in a substantially rectangular shape, so that the terminal insertion portion 512 of the terminal block 51 is insertable into the motor housing 4 through the terminal block insertion hole 41.

Three screw accommodating bores 231 are formed at an end surface portion of the terminal attaching portion 23 (i.e. at a left end surface portion of the terminal attaching portion 23 in FIG. 2). Each of the screw accommodating bores 231 is formed so that axes thereof extend in a horizontal direction to be in parallel to each other. Accordingly, the screw accommodating bores 231 are formed so as to extend in the axial direction (see FIG. 2). Furthermore, the screw accommodating bores 231 are formed to be aligned in a vertical direction on the terminal block attaching portion 23 so that the alignment substantially corresponds to a circumferential direction of the stator 2. Each of the screw accommodating bores 231 does not penetrate through the terminal block attaching portion 23. In other words, each of the terminal accommodating bores 231 is formed to have a bottom. Three mounting nuts 232 made of metal are provided at the terminal attaching portion 23 by insert molding. Each of the mounting nuts 232 are formed at the terminal attaching portion 23 so as to surround the corresponding screw accommodating bore 231. An internal thread portion, which is formed on an inner circumferential surface of each of the mounting nuts 232 inwardly extends from the corresponding screw accommodating bore 231 (see FIG. 3).

A stepped portion 233 is formed between an end surface of each of the terminal attaching portion 23 and the corresponding mounting nut 232. Each of the stepped portions 233 is formed as if an end surface of the terminal attaching portion 23 is dug down in a perfect circular shape. First terminals 22a, 22b and 22c, which are connected to the stator coils 22, are arranged within the stepped portions 233, respectively (see FIGS. 2 to 4). The first terminals 22a, 22b and 22c generate and supply a three-phase alternating current to the stator coil 22. Furthermore, each of the first terminals 22a, 22b and 22c is made from a metal plate having the electric conductivity, and is connected to a predetermined number of the stator coils 22. Additionally, an insertion hole is formed on each of the first terminals 22a, 22b and 22c corresponding to each of the screw accommodating bores 231.

The first terminal 22a, which is arranged at an uppermost position among the first terminals 22a, 22b and 22c in FIG. 2, serves as a first terminal for a V-phase, which will be hereinafter referred to as a V-phase first terminal 22a. The first terminal 22b arranged at the middle among the first terminals 22a, 22b and 22c in FIG. 2 serves as a first terminal for a W-phase, which will be hereinafter referred to as a W-phase first terminal 22b. Furthermore, the first terminal 22c arranged at a bottommost position among the first terminals 22a, 22b and 22c in FIG. 2 serves as a first terminal for a U-phase, which will be hereinafter referred to as a U-phase first terminal 22c. In this embodiment, the V-phase first terminal 22a, the W-phase first terminal 22b and the U-phase first terminal 22c are referred to as the first terminals 22a, 22b and 22c in order to comprehensively mention the first terminals.

A blocking wall 42 is formed at the motor housing 4 so as to surround all four sides of the terminal block insertion hole 41 (see FIG. 1). More specifically, the blocking wall 42 is integrally formed at the motor housing 4 so as to outwardly protrude from an outer peripheral surface of the motor housing 4. Three attachment bores 422 are formed at a cable attaching portion 421 (i.e., serving as a cable retaining portion) provided at an upper portion of the blocking wall 42 (see FIG. 2; one of the attachment bores 422 is shown in FIG. 2). End portions of cables 61a, 61b and 61c (i.e., serving as a feed cable), which configure the electric power supply wiring member 6, are engaged with and fixed within the attachment bores 422, respectively.

The cables 61a, 61b and 61c are configured to supply the three-phase alternating current to the first terminals 22a, 22b and 22c. As illustrated in FIG. 1, end portions of the cables 61a, 61b, 61c are arranged to be aligned in substantially the same direction with an orientation of the rotational axis of the rotor 3 of the in-wheel motor 1. The cable 61a arranged in the middle among the cables 61a, 61b and 61c serves as a cable for the V-phase, which will be hereinafter referred to as a V-phase cable 61a. The cable 61b arranged at the left in FIG. 1 among the cables 61a, 61b and 61c serves as a cable for the W-phase, which will be hereinafter referred to as a W-phase cable 61b. Furthermore, the cable 61c, which is arranged at the right in FIG. 1 among the cables 61a, 61b and 61c serves as a cable for the U-phase, which will be hereinafter referred to as a U-phase cable 61c. The V-phase cable 61a, the W-phase cable 61b and the U-phase cable 61c will be referred to as the cables 61a, 61b and 61c in a case of comprehensively mentioning the V-phase cable 61a, the W-phase cable 61b and the U-phase cable 61c.

As illustrated in FIG. 1, the cables 61a, 61b and 61c are retained by a first clamp 482 and a second clamp 483 of the steering knuckle arm 48 to descend along the steering knuckle arm 48 avoiding interference with other components when steering the front wheel 8. For an explanatory purpose, a method for attaching the cables 61a, 61b and 61c to the blocking wall 42 will be explained hereinafter with respect to the V-phase cable 61a based on the illustrations in FIG. 2. Explanations are not repeated for the W-phase cable 61b and the U-phase cable 61c, however, the W-phase cable 61b and the U-phase cable 61c are attached to the blocking wall 42 in a similar manner.

The plug 62a in which a core wire of the cable 61a penetrates through is formed at an end portion of the V-phase cable 61a. A V-phase second terminal (i.e., serving as a second terminal) 63a, which is made from electric conductive metal plate and is connected to the core wire, extends from an end portion of the plug 62a. The V-phase second terminal 63a is two dimensionally bent to connect the end portion of the V-phase cable 61a and the V-phase first terminal 22a (see FIG. 5).

Similar to the construction of the V-phase second terminal 63a, a W-phase second terminal 63b (i.e., serving as a second terminal) and a U-phase second terminal (i.e., serving as a second terminal) 63c extend from end portions of the W-phase cable 61b and the U-phase cable 61c, respectively. Further, the W-phase second terminal 63b and the U-phase second terminal 63c are three dimensionally bent to connect the end portion of the W-phase cable 61b and the W-phase first terminal 22b and to connect the end portion of the U-phase cable 61c and the U-phase first terminal 22c, respectively (see FIG. 5). Hereinafter, the V-phase second terminal 63a, the W-phase second terminal 63b, and the U-phase second terminal 63c are referred to as the terminals 63a, 63b, and 63c for the purpose of comprehensively referring to the V-phase second terminal 63a, the W-phase second terminal 63b, and the U-phase second terminal 63c.

An annular attachment groove is formed on a side surface of the plug 62a. An attachment plate 43 is fixed to a top surface of the cable attaching portion 421 by means of a plate screw 44. The plug 62a is inserted into the attachment plate 43 and the cable attaching portion 421, and the attachment plate 43 is fitted to the annular attachment groove so that the plug 62a is fixed to the cable attaching portion 421.

Further, a ring-shaped sealing groove 62a1 is formed on the side surface of the plug 62a. An O-ring 64 is mounted to the sealing groove 62a1. Inserting the plug 62a into the cable attaching portion 421, the O-ring 64 comes to contact with an inner peripheral surface of an attaching hole 422 to prevent the water from entering inside the blocking wall 42.

A blocking plate 46 is attached to an end surface (at a left in FIG. 2) of the blocking wall 42 by means of plural fixing screws 45. A gasket 47 is provided between the blocking plate 46 and the end surface of the blocking wall 42. Accordingly, an inside of the blocking wall 42 is liquid-tightly blocked from the outside. FIG. 1 shows a state where the blocking plate 46 is not provided at the motor housing 4.

Figure 6:
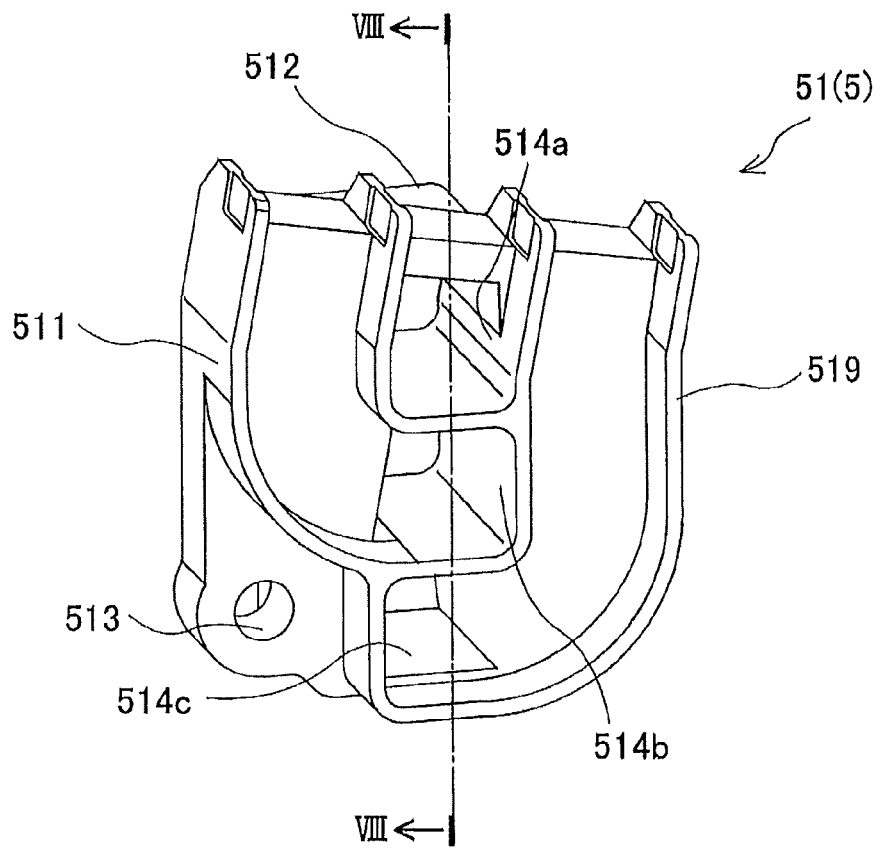
FIG. 6 is a perspective view of a terminal block viewed from an external side of a motor housing.
Figure 7:
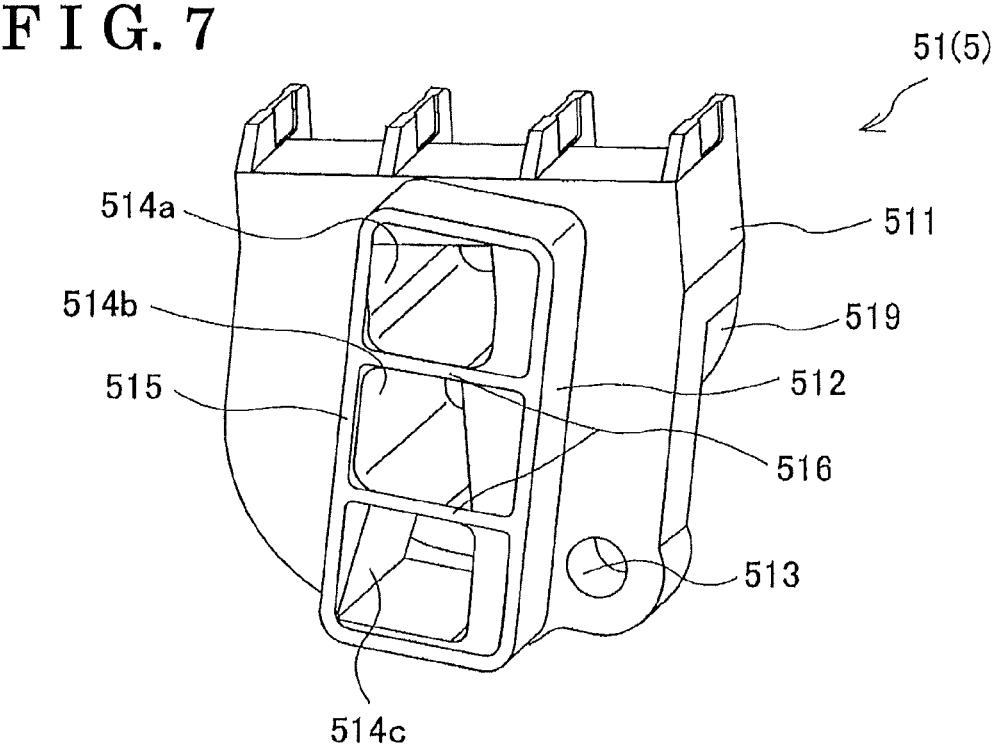
FIG. 7 is a perspective view of the terminal block viewed from a stator side in FIG. 2.
Figure 8:
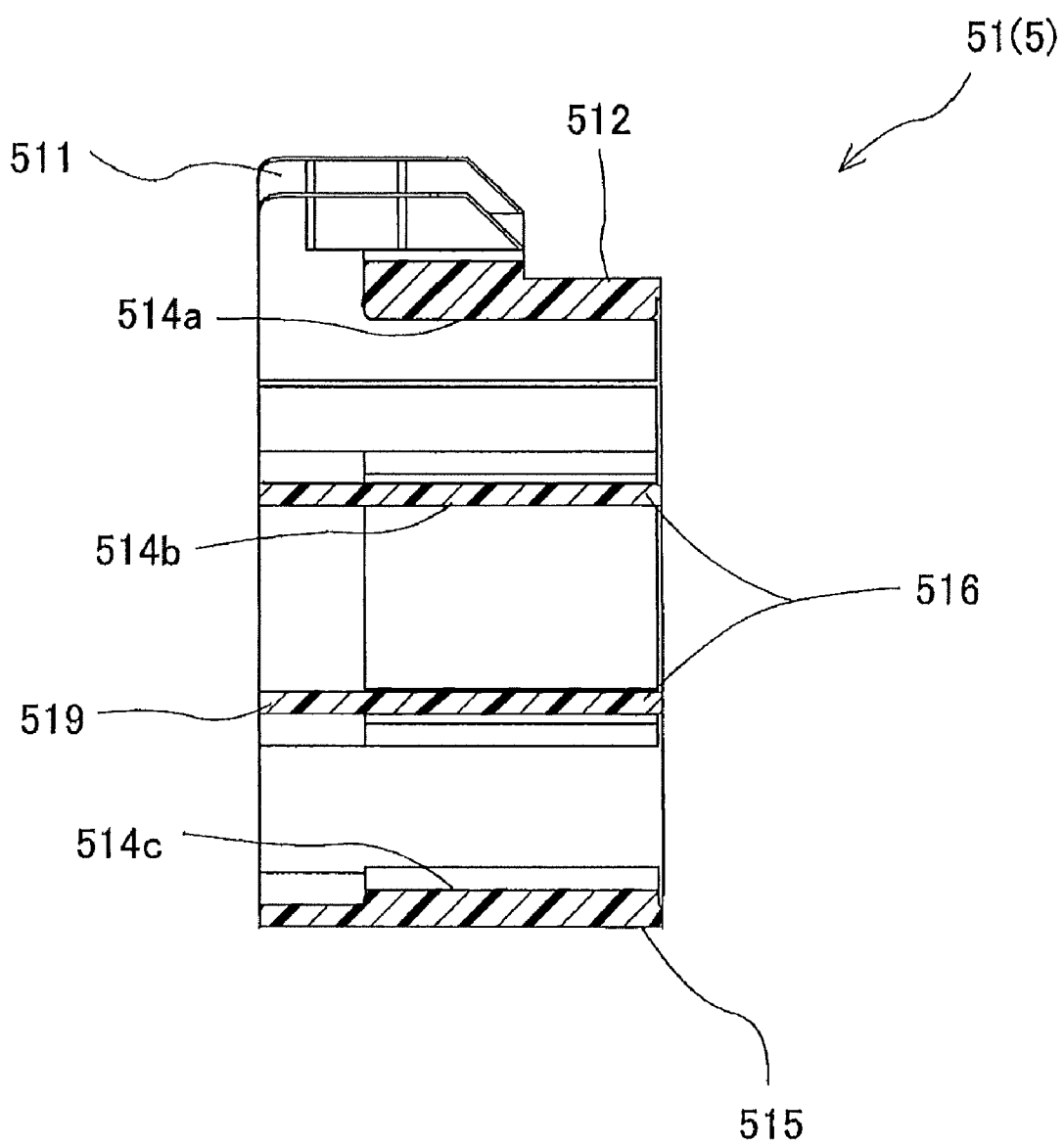
FIG. 8 is a cross-sectional view of the terminal block taken on line VIII-VIII in FIG. 6.

Constructions of a connecting structure unit 5 according to the embodiment will be explained hereinafter. A terminal block (i.e., serving as a base block) 51 which configures the connecting structure unit 5 is attached to the motor housing 4 at an inside relative to the blocking wall 42 (see FIG. 1). The terminal block 51 is integrally formed and made from synthetic resin material having insulation. As illustrated in FIGS. 6 to 8, the terminal block 51 includes a body portion 511 and the terminal insertion portion 512 formed at a bottom of the body portion 511 (i.e., at a lateral side when the terminal block 51 is mounted to the vehicle). As illustrated in FIGS. 6 to 8, an attaching through hole 513 is formed on the body portion 511 of the terminal block 51. An attaching bolt 52 positioned through the attaching through hole 513 is screwed to an outer wall of the motor housing 4 to fix the terminal block 51 within the blocking wall 42 of the motor housing 4 (see FIG. 1).

As shown in FIG. 2, three terminal insertion slots (i.e., serving as an insertion hole) 514a, 514b, and 514c are formed on the body portion 511 corresponding to the positions of the screw accommodating bores 231 formed at the terminal attaching portion 23. The terminal insertion slots 514a, 514b, and 514c are arranged in a vertical direction at a center portion of the body portion 511 in FIG. 1.

The terminal insertion slot 514a arranged at an uppermost position among three terminal insertion slots 514a, 514b, and 514c in FIG. 2 serves as a terminal insertion slot for the V-phase, which will be hereinafter referred to as a V-phase terminal insertion slot 514a. The terminal insertion slot 514b arranged in a middle among three terminal insertion slots 514a, 514b, and 514c in FIG. 2 serves as a terminal insertion slot for the W-phase, which will be hereinafter referred to as a W-phase terminal insertion slot 514b. Further, the terminal insertion slot 514c arranged at a bottommost position among three terminal insertion slots 514a, 514b, and 514c in FIG. 2 serves as a terminal insertion slot for the U-phase, which will be hereinafter referred to as a U-phase terminal insertion slot 514c. The terminal insertion slots 514a, 514b, and 514c are formed penetrating through the body portion 511 and the terminal insertion portion 512 (see FIG. 8). Hereinafter, the V-phase terminal insertion slot 514a, the W-phase terminal insertion slot 514b, and the U-phase terminal insertion slot 514c are referred to as the terminal insertion slots 514a, 514b, and 514c for the purpose of comprehensively referring to the V-phase terminal insertion slot 514a, the W-phase terminal insertion slot 514b, and the U-phase terminal insertion slot 514c.

As illustrated in FIG. 2, the V-phase second terminal 63a is positioned penetrating through the V-phase terminal insertion slot 514a. The W-phase second terminal 63b is positioned penetrating through the W-phase terminal insertion slot 514b. Further, the U-phase second terminal 63c is positioned penetrating through the U-phase terminal insertion slot 514c.

The terminal insertion portion 512 of the terminal block 51 is configured in a substantially rectangular shape enclosed by walls 515, which serves as a wall portion, or predetermined portion. Two partition plates 516, which serves as a wall portion, or predetermined portion, are formed on a pair of the facing walls 515 so as to divide the attached second terminals 63a, 63b, and 63c from each other (see FIG. 7). The terminal insertion portion 512 is inserted into the terminal block insertion hole 41 to be provided at a position to face the terminal attaching portion 23 of the stator 2. In those circumstances, each of the first terminals 22a, 22b, and 22c and the motor housing 4 are blocked by the walls 515 and the partition plates 516. Accordingly, a clearance distance and a creepage distance are ensured between each of the first terminals 22a, 22b, and 22c and the motor housing 4, thereby securely insulating therebetween.

After being positioned in the V-phase terminal insertion hole 514a, the V-phase second terminal 63a is superimposed on the V-phase first terminal 22a. In those circumstances, a terminal fixation bolt (i.e., serving as a screw bolt, or screw member) 56 is inserted into a through hole of the V-phase second terminal 63a and an insertion hole of the V-phase first terminal 22a so as to be threadedly engaged with the mounting nut 232 of the terminal attaching portion 23. By screwing the terminal fixation bolt 56, the V-phase second terminal 63a and the V-phase first terminal 22a are jointly fastened to the terminal attaching portion 23 (see FIG. 3). Accordingly the V-phase second terminal 63a and the V-phase first terminal 22a are electrically connected.

Figure 5:
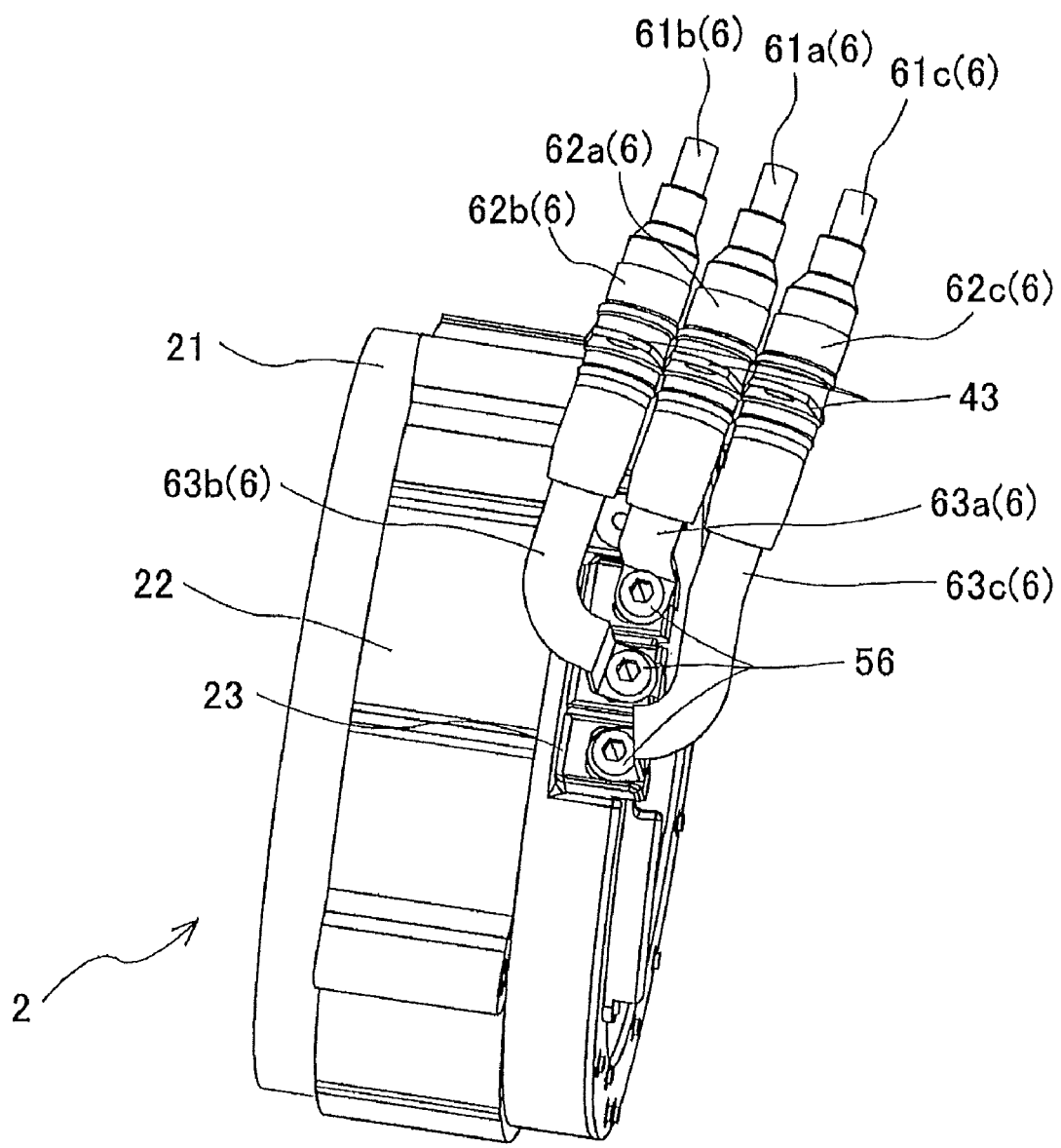
FIG. 5 is a perspective view of the stator after the terminals are connected thereto.

Similarly, the W-phase second terminal 63b and the U-phase second terminal 63c are superimposed on the W-phase first terminal 22b and the U-phase first terminal 22c, respectively, after being positioned in the W-phase terminal insertion hole 514b and the U-phase terminal insertion hole 514c, respectively (see FIG. 5). In those circumstances, the terminal fixation bolts 56 are inserted into respective through holes for the W-phase first terminal 22b and the U-phase first terminal 22c, respectively, so as to be threadedly engaged with the corresponding mounting nut 232 of the terminal attaching portion 23.

By screwing the terminal fixation bolt 56, the W-phase second terminal 63b and the W-phase first terminal 22b are jointly fastened to the terminal attaching portion 23. Accordingly the W-phase second terminal 63b and the W-phase first terminal 22b are electrically connected. Further, by screwing the terminal fixation bolt 56, the U-phase second terminal 63c and the U-phase first terminal 22c are jointly fastened to the terminal attaching portion 23 so that the U-phase second terminal 63c and the U-phase first terminal 22c are electrically connected.

As described above, the cables 61a, 61b, and 61c are arranged descending along the steering knuckle arm 48 from the inverter, and the end portions of the cables 61a, 61b, and 61c are arranged side by side in a direction which substantially corresponds to the rotational axis direction of the rotor 3 (i.e., a width direction of a vehicle). Arrangements of connecting mates (e.g., first terminals 22a, 22b, 22c) to which the end portions of the cables 61a, 61b, 61c are connected can be changed because of two-dimensionally bent or three-dimensionally bent second terminals 63a, 63b, and 63c. Thus, each of the first terminals 22a, 22b, and 22c is fixed to the terminal attaching portion 23 in a manner being arranged substantially in a circumferential direction of the stator 2 (i.e., the vertical direction of the vehicle). The terminal block 51, the attaching bolt 52, and the terminal fixation bolt 56 configure the connecting structure unit 5.

As illustrated in FIG. 6, a partition wall 519, which serves as a wall portion, or a predetermined member, is formed upright on the body portion 511 of the terminal block 51 in order to block the adjacent second terminals 63a, 63b, and 63c, and the motor housing 4 from each other. Accordingly, a clearance distance and a creepage distance are ensured between the second terminals 63a, 63b, and 63c and the motor housing 4, thereby securely insulating therebetween. Voids are formed on the body portion 511 by the partition wall 519 on the model of configurations of the second terminals 63a, 63b, and 63c (see FIG. 6). Accordingly, the second terminals 63a, 63b, and 63c are guided by the partition wall 519 of the terminal block 51 so that the second terminals 63a, 63b, and 63c are not moved, or rattled by oscillations of the vehicle, or the like.

According to the embodiment, each of the first terminals 22a, 22b, 22c and each of the second terminals 63a, 63b, 63c positioned penetrating through the motor housing 4 are jointly fastened to the terminal attaching portion 23 formed on the stator 2 to establish an electric conduction between the second terminals 63a, 63b, 63c and the first terminals 22a, 22b, 22c, respectively, and the second terminals 63a, 63b, 63c are bent, or curved so as to connect the end portions of the cables 61a, 61b, 61c and the first terminals 22a, 22b, 22c, respectively.

Accordingly, even if orientations (arranged directions) of the end portions of the plural cables 61a, 61b, 61c and orientations (arranged directions) of the first terminals 22a, 22b, 22c of the stator coil 2 are different, the end portions of the cable 61a, 61b, 61c and the first terminals 22a, 22b, 22c are connected by the bent second terminals 63a, 63b, 63c. Thus, a downsized wire connection structure requiring lower cost without using a bus bar and a bolt fixing the bus bar, or the like, can be attained. Further, because orientations (arranged directions) of the plural cables 61a, 61b, 61c and the arranged directions of the plural first terminals 22a, 22b, 22c can be differed according to the construction of the embodiment, a degree of freedom in cable routing of the cables 61a, 61b, 61c is enhanced.

Further, because each of the second terminals 63a, 63b, 63c which is positioned penetrating through the motor housing 4 and each of the corresponding first terminals 22a, 22b, 22c are jointly fastened to the terminal attaching portion 23 formed at the stator 2, the terminal block 51 is not necessarily required. Further, even if a level of tightening of a terminal fixation bolt 56 is increased in order to enhance the electric conductivity between the second terminals 63a, 63b, 63c and the first terminals 22a, 22b, 22c, respectively, the application of the excessive load to the terminal block 51 can be prevented.

Still further, because the wire connection structure is formed externally relative to the stator 2, the constructions of the second terminals 63a, 63b, 63c and the first terminals 22a, 22b, 22c are unlikely limited by the space related condition, and the electric conductivity can be enhanced by increasing electrically conductive dimensions of the second terminals 63a, 63b, 63c and the first terminals 22a, 22b, 22c. Further, according to the constructions of the embodiment, because the rotor 3 can be mounted after mounting the stator 2 inside the motor housing 4, assembling performance of the in-wheel motor 1 is enhanced.

The in-wheel motor 1 is mounted inside the front wheel 8 serving as the driving wheel of the vehicle. End portions of the plural cables 61a, 61b, 61c are arranged at the cable attaching portion 412 in a direction which is substantially the same direction with the rotational axis of the rotor 3. The plural first terminals 22a, 22b, 22c are arranged on the terminal attaching portion 23 in a direction which is substantially a circumferential direction of the stator 2. According to the foregoing constructions, the cables 61a, 61c, 61c which are arranged descending along the steering knuckle arm 48 avoiding interferences with other members inside the front wheel 8 with small space, can be readily connected to the in-wheel motor 1.

Further, according to the construction of the embodiment, because each of the second terminals 63a, 63b, 63c are guided by the partition wall 519 at the terminal block 51, the bent second terminals 63a, 63b, 63c are rigidly supported by the partition wall 519 so that the bent second terminals 63a, 63b, 63c are prevented from being damaged due to oscillations of the vehicle, or the like. Further, because the partition wall 519 is formed on the body portion 511 of the terminal block 51 and the walls 515 and the partition plates 516 are formed at the terminal insertion portion 512, insulation performance of the adjacent terminals 63a, 63b, 63c and the first terminals 22a, 22b, 22c can be enhanced so as to supply a large current to the stator coils 22a, 22b, and 22c.

The disclosure of the electric motor having the wire connection structure is not limited to the foregoing embodiment, and may be modified in various manners. An electric motor applicable to the disclosure is not limited to a synchronous motor, and any electric motor is applicable. Further, the electric motor applicable to the disclosure is not limited to an in-wheel motor mounted to an inside of a disc wheel of a vehicle wheel, and is applicable to other motors for vehicles, motors for consumer electrical appliances, and industrial electric motors.

According to the disclosure, the first terminals 22a, 22b, 22c and the second terminals 63a, 63b, 63c may be assembled to the terminal attaching portion 23 in the following manners. That is, while the second terminals 63a, 63b, 63c are provided between the terminal attaching portion 23 and each of the first terminals 22a, 22b, 22c, each of the terminal fixation bolt 56 is provided penetrating through the corresponding first terminal 22a, 22b, 22c and the second terminal 63a, 63b, 63c in the mentioned order so that the first terminals 22a, 22b, 22c and the second terminals 63a, 63b, 63c are mounted to the terminal attaching portion 23. In addition, the cable attaching portion 421 may be separately provided on the motor housing 4.

According to the embodiment, the second terminal 63a, 63b, 63c and the first terminal 22a, 22b, 22c are electrically connected each other by jointly fastening the second terminals 63a, 63b, 63c, which are positioned penetrating through the motor housing 4, and the first terminals 22a, 22b, 22c to the terminal attaching portion (fixing portion) 23, which is formed at the stator 2, by means of the terminal fixation bolt (screw bolt, or screw member) 56. At least one of the plural second terminals 63a, 63b, 63c is bent to connect the end portion of the cable (feed cable) 61a, 61b, 61c and the first terminal 22a, 22b, 22c. Thus, even if the orientation of the end portions of the feed cables 61a, 61b, 61c and the orientation of the stator coil terminals (first terminal) 22a, 22b, 22c differ from one another, the bent second terminal 63a, 63b, 63c allows to connect the end portion of the feed cable 61a, 61b, 61c and first terminal 22a, 22b, 22c. Accordingly, the downsized wire connection with lower manufacturing cost is attained without using bus bars and bolts connecting the busburs, or the like.

Further, because the second terminals 63a, 63b, 63c, which are positioned penetrating through the motor housing 4, and the first terminals 22a, 22b, 22c are jointly fastened to the terminal attaching portion (fixing portion) 23 formed at the stator 2, the terminal block 51 is not necessarily required. Further, when the terminal block 51 is applied, even if the tightening level of the terminal fixation bolt (screw bolt, or screw member) 56 is increased in order to enhance the electric conductivity between the second terminals 63a, 63b, 63c and the first terminals 22a, 22b, 22c, respectively, the application of the excessive load to the terminal block 56 is prevented. Further, because the wire connection structure is formed externally relative to the stator 2, the constructions of the second terminals 63a, 63b, 63c and the first terminals 22a, 22b, 22c are unlikely limited by the space related condition, and the electric conductivity can be enhanced by increasing electrically conductive dimensions of the second terminals 63a, 63b, 63c and the first terminals 22a, 22b, 22c.

According to the embodiment, the electric motor (in-wheel motor) 1 is mounted within the driving wheel 8 of the vehicle, a rotational force of the rotor 2 is transmitted to the driving wheel 8, the end portions of the plural feed cables 61a, 61c, 61c are arranged at the cable retaining portion (cable attaching portion) 421 along a rotational axis direction of the rotor 2, and the plural first terminals 22a, 22b, 22c are arranged on the terminal attaching portion (fixing portion) 23 along a circumferential direction of the stator 2.

According to the embodiment, the electric motor (in-wheel motor) 1 is mounted within the driving wheel 8 of the vehicle, the end portions of the plural feed cables (cables) 61a, 61b, 61c are arranged at the cable retaining portion (cable attaching portion) 421 in the rotational axis direction of the rotor 2, and the plural first terminals 22a, 22b, 22c are arranged on the terminal attaching portion (fixing portion) 23 in the substantially circumferential direction of the stator 2. Accordingly, the cables (feed cables) 61a, 61c, 61c, which are arranged descending from the vehicle body avoiding interferences with other members within the front wheel 8 with small space, can be readily connected to the electric motor (in-wheel motor) 1.

According to the embodiment, the electric motor (in-wheel motor) 1 having the wire connection structure further includes the terminal block (base block) 51 made from an insulating material and positioned in terminal block insertion hole (through hole) 41, and the terminal block (base block) 51 including plural terminal insertion slots (insertion holes) 514a, 514b, and 514c each allowing insertion of the second terminal 63a, 63b, 63c, the second terminal 63a, 63b, 63c being positioned in the insertion hole and being superimposed on the corresponding first terminal. The terminal fixation bolt (screw bolt, or screw member) 56, which is inserted through the first terminal 22a, 22b, 22c and the second terminal 63a, 63b, 63c, is threadedly engaged with the terminal attaching portion (fixing portion) 23 after the second terminal 63a, 63b, 63c is superimposed on the corresponding first terminal 22a, 22b, 22c to electrically connect the first terminal 22a, 22b, 22c and the second terminal 63a, 63b, 63c. At least the bent second terminal 63a, 63b, 63c is guided by the terminal block (base block) 51 along a bent configuration thereof by means of the predetermined member (partition wall) 519.

According to the embodiment, the second terminals 63a, 63b, 63c are positioned penetrating through the terminal block (base block) 51 having insulation, the second terminals 63a, 63b, 63c and the first terminals 22a, 22b, 22c are electrically connected by threadedly connecting the terminal fixation bolt (screw bolt, or screw member) 56 which is inserted through the second terminals 63a, 63b, 63c and the first terminals 22a, 22b, 22c to the terminal attaching portion (fixing portion) 23, and the bent second terminals 63a, 63b, 63c are guided at the terminal block 51. Accordingly, the second terminals 63a, 63b, 63c are rigidly supported so that the second terminals 63a, 63b, 63c are prevented from being damaged. Further, because the second terminals 63a, 63b, 63c and the first terminals 22a, 22b, 22c are electrically connected each other by threadedly connecting the terminal fixation bolt 56 to the terminal attaching portion 23, excessive force is not applied to the terminal block 51, thereby preventing the terminal block 51 from being damaged.

According to the embodiment, the predetermined member 519 corresponds to the wall portion 519 formed on the base block in an upright manner for insulating the adjacent second terminals 63a, 63b, 63c.

According to the embodiment, because the wall portion (wall, partition plate, partition wall) 515, 516, 519 for insulating the adjacent terminals 63a, 63b, 63c and the first terminals 22a, 22b, 22c is provided on the terminal block 51 upright therefrom, the insulation performance of the adjacent terminals 63a, 63b, 63c and the first terminals 22a, 22b, 22c are enhanced and a large current can be supplied to the stator coil 22.

According to the embodiment, the second terminals 63a, 63b, 63c, which are positioned penetrating through the motor housing 4, and the first terminals 22a, 22b, 22c are jointly fastened to the terminal attaching portion (fixing portion) 23 formed at the stator 2 by means of the terminal fixation bolt (screw bolt, or screw member) 56 to electrically connect the second terminals 63a, 63b, 63c and the first terminals 22a, 22b, 22c. Further, according to the embodiment, at least one of the plural second terminals 63a, 63b, 63c is bent so as to connect the end portion of the feed cable 61a, 61b, 61c and the first terminal 22a, 22b, 22c. Accordingly, even if the orientation of the end portions of the plural feed cables 61a, 61b, 61c and the orientation of the first terminals 22a, 22b, 22c of the stator coil 22 differ from each other, the end portion of the feed cable 61a, 61b, 61c and the first terminal 22a, 22b, 22c are connected by means of the bent second terminal 63a, 63b, 63c, thereby downsizing and reducing manufacturing costs of the wire connection structure of the electric motor without using the bus bars and the bolts connecting the bus bars.

Further, because the second terminals 63a, 63b, 63c and the first terminals 22a, 22b, 22c are jointly fastened to the terminal attaching portion (fixing portion) 23 formed on the stator 2, the terminal block 51 is not necessarily required, and even if the level of tightening of the terminal fixation bolt (screw bolt, or screw member) 56 is increased in order to enhance the electric conductivity between the second terminals 63a, 63b, 63c and the first terminals 22a, 22b, 22c, an excessive load is prevented from being applied to the terminal block 51. Further, because the wire connection structure is formed externally relative to the stator 2, the second terminals 63a, 63b, 63c and the first terminals 22a, 22b, 22c are less susceptible to the restriction in terms of the space, and thus the electrically conductive dimensions of the second terminals 63a, 63b, 63c and the first terminals 22a, 22b, 22c are increased to enhance the electric conductivity.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electric motor having a wire connection structure for connecting a plurality of feed cables, which supply a polyphase alternating current from outside, to the electric motor, comprising:
   a stator including a stator coil;
   a rotor arranged at an inner side relative to an inner circumferential surface of the stator to be rotatable relative to the stator;
   a motor housing accommodating therewithin the stator and the rotor, the motor housing formed with a through hole;
   a cable retaining portion formed on the motor housing for retaining each end portion of the feed cables in a predetermined arrangement;
   a fixing portion formed on the stator and extending towards the through hole from an inside of the motor housing;
   a plurality of first terminals connected to the stator coil and arranged on the fixing portion in an orientation different from the predetermined arrangement of the end portions of the feed cables;
   a plurality of second terminals, each of the second terminals projecting from the end portion of one of the feed cables;
   a base block made from an insulating material and positioned in the through hole, the base block including a plurality of insertion holes each allowing insertion of a corresponding one of the second terminals;
   each of the second terminals being positioned in the corresponding insertion hole and being superimposed on a corresponding first terminal after being inserted into the through hole from outside the motor housing;
   at least one of the second terminals being bent for connecting the end portion of the feed cable and the corresponding first terminal;
   a plurality of screw bolts threadedly engaged with the fixing portion after being inserted into the corresponding first terminals and the second terminals, each of the screw bolts jointly fastening the corresponding first terminal and the second terminal to the fixing portion so that the first terminal and the second terminal are electrically connected;
   wherein the screw bolt, which is inserted through the corresponding first terminal and the corresponding second terminal, is threadedly engaged with the fixing portion after the corresponding second terminal is superimposed on the corresponding first terminal to electrically connect the corresponding first and second terminals; and
   the at least one bent second terminal is guided by the base block along a bent configuration thereof by a predetermined member.

2. The electric motor having the wire connection structure according to claim 1, wherein
   the electric motor is mounted within a driving wheel of a vehicle, a rotational force of the rotor is transmitted to the driving wheel;
   the end portions of the plural feed cables are arranged at the cable retaining portion along a rotational axis direction of the rotor; and
   the plural first terminals are arranged on the fixing portion along a circumferential direction of the stator.

3. The electric motor having the wire connection structure according to claim 1, wherein the predetermined member corresponds to a wall portion formed on the base block in an upright manner for insulating the adjacent second terminals.

4. A method for connecting wire for an electric motor for connecting a plurality of feed cables which supply a polyphase alternating current from outside to the electric motor including a stator having a stator coil, a plurality of first terminals connected to the stator coil, a rotor arranged at an inner side relative to an inner circumferential surface of the stator to be rotatable relative to the stator, and a motor housing accommodating therewithin the stator and the rotor and having a through hole, a base block made from insulating material and positioned within the through hole, the base block including a plurality of insertion holes each allowing insertion of a second terminal, the method comprising:
   providing a cable retaining portion retaining an end of each of the feed cables in a predetermined direction on the motor housing;
   providing a fixing portion extending towards the through hole from an inside of the stator;
   arranging each of the first terminals in a direction different from the predetermined direction of the end portion of the feed cable;
   superimposing each of the second terminals projecting from the end portions of each of the feed cables on a corresponding first terminal after inserting the second terminal into one of the insertion holes;
   connecting the end portion of the feed cable, which corresponds to the second terminal, and the first terminal by at least one bent second terminal among the second terminals;
   guiding the bent second terminal along a bent configuration by a predetermined member of the base block; and
   jointly fastening the first terminal and the second terminal to the fixing portion by threadedly engaging each screw bolt with the fixing portion after inserting the screw bolt into the corresponding first terminal and the second terminal, and after superimposing the second terminal on the corresponding first terminal, so that the first terminal and the second terminal are electrically connected.

5. An electric motor having a wire connection structure for connecting a plurality of feed cables, which supply a polyphase alternating current from outside, to the electric motor, comprising:
   a stator including a stator coil;
   a rotor rotatably provided relative to the stator;
   a motor housing accommodating the stator and the rotor, the motor housing formed with a through hole;
   a cable retaining portion formed on the motor housing for retaining end portions of the plural feed cables;
   a fixing portion formed on the stator and extending towards the through hole;
   a plurality of first terminals connected to the stator coil and arranged on the fixing portion in an orientation different from an orientation of the end portions of the feed cables;
   a plurality of second terminals, each of the second terminals projecting from the end portion of one of the feed cables to face a corresponding first terminal after being inserted into the through hole from outside of the motor housing, at least one of the plural second terminals being bent;
   a plurality of screw members engaged with the fixing portion after being inserted into corresponding first terminals and the second terminals, each of the screw members jointly fastening the corresponding first terminal and the second terminal to the fixing portion so that the first terminal and the second terminal are electrically connected;

a base block made from an insulating material and positioned in the through hole, the base block including a plurality of insertion holes each allowing insertion of one of the second terminals;

each of the second terminals being positioned in a corresponding one of the insertion holes and being superimposed on the corresponding first terminal;

wherein the screw member, which is inserted through the first terminal and the second terminal, is threadedly engaged with the fixing portion after the second terminal is superimposed on the corresponding first terminal to electrically connect the first terminal and the second terminal; and the at least one bent second terminal is guided by the base block along a bent configuration thereof by a predetermined member.

6. The electric motor having the wire connection structure according to claim 5, wherein the electric motor is mounted within a driving wheel of a vehicle, a rotational force of the rotor is transmitted to the driving wheel;

the end portions of the plural feed cables are arranged at the cable retaining portion along a rotational axis direction of the rotor; and the plural first terminals are arranged on the fixing portion along a circumferential direction of the stator.

7. The electric motor having the wire connection structure according to claim 5, wherein the predetermined member corresponds to a wall portion formed on the base block in an upright manner for insulating the adjacent second terminals.

* * * * *